Dec. 16, 1947.  T. BAILEY  2,432,494
CONTAINER-SUPPORTING RACK FOR KITCHEN CABINETS AND THE LIKE
Filed April 4, 1944   4 Sheets-Sheet 1

Theodore Bailey
INVENTOR.

BY
Victor J. Evans & Co.
ATTORNEYS

Dec. 16, 1947.                    T. BAILEY                      2,432,494
           CONTAINER-SUPPORTING RACK FOR KITCHEN CABINETS AND THE LIKE
                        Filed April 4, 1944          4 Sheets-Sheet 2

INVENTOR.
Theodore Bailey
BY
Victor J. Evans & Co.
ATTORNEYS

Dec. 16, 1947. T. BAILEY 2,432,494
CONTAINER-SUPPORTING RACK FOR KITCHEN CABINETS AND THE LIKE
Filed April 4, 1944 4 Sheets-Sheet 4

INVENTOR.
Theodore Bailey
BY
Victor J. Evans & Co.
ATTORNEYS

Patented Dec. 16, 1947

2,432,494

UNITED STATES PATENT OFFICE 2,432,494

CONTAINER-SUPPORTING RACK FOR KITCHEN CABINETS AND THE LIKE

Theodore Bailey, Habana, Cuba

Application April 4, 1944, Serial No. 529,513

4 Claims. (Cl. 312—172)

This invention appertains to improvements in dispensing units generally, and more particularly to a type thereof designed for the individual dispensing of a number of the ingredients or materials usually employed in kitchens for baking and cooking purposes.

An object of the invention is to provide a unit of this kind that will be attractive in appearance, allow for the keeping of a bulk supply of the ingredients or materials conveniently at hand for instant use, and keep the individual containers and their contents in clean and sanitary condition at all times.

Another object of the invention has to do with the provision of a novel form of cabinet in which individual containers for the various ingredients or materials will be supported in an orderly arrangement and in a manner to be easy of access, both for the dispensing of portions of the ingredients or materials and the removal and replacement of the containers for a replenishment of the contents thereof.

A further object of the invention is to provide a unit as hereinbefore characterized and one wherein certain of the containers are each provided with attachments for the measuring and dispensing of portions of their contents, without necessitating the removal of the containers from their respective positions within the cabinet in which they are housed.

Yet another object of the invention is to provide a kitchen cabinet of the class described, and one that is of general utility, with ample provision for the storage of food supplies and/or articles of equipment usually found in household kitchens, in addition to the beforementioned accessories for facilitating the preparation of foods.

With these and other objects and advantages of equal importance in view, the invention resides in the certain new and useful combination, construction and arrangement of parts and dispensing devices, as will be hereinafter more fully described, set forth in the appended claims, and illustrated in the accompanying drawings, in which:

Figure 1:
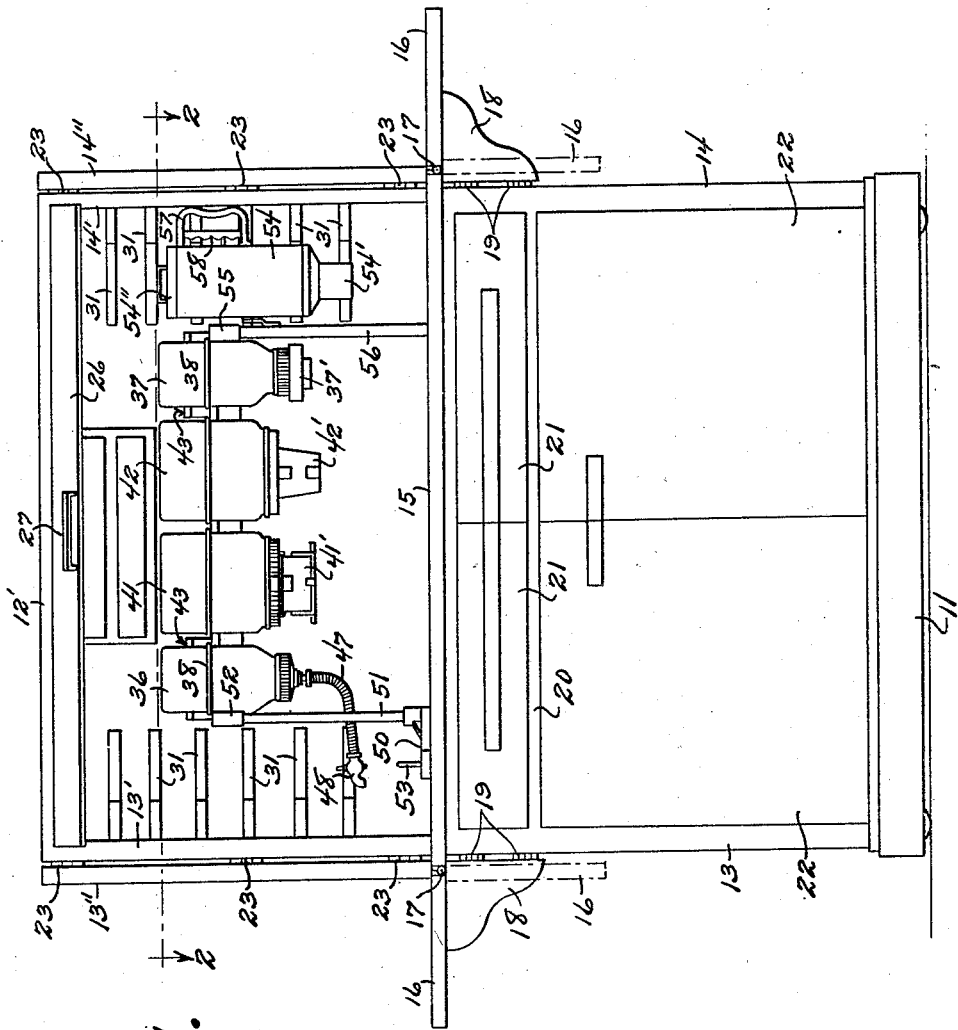
Figure 1 is a front elevation of the dispensing unit, in accordance with the invention.
Figure 3:
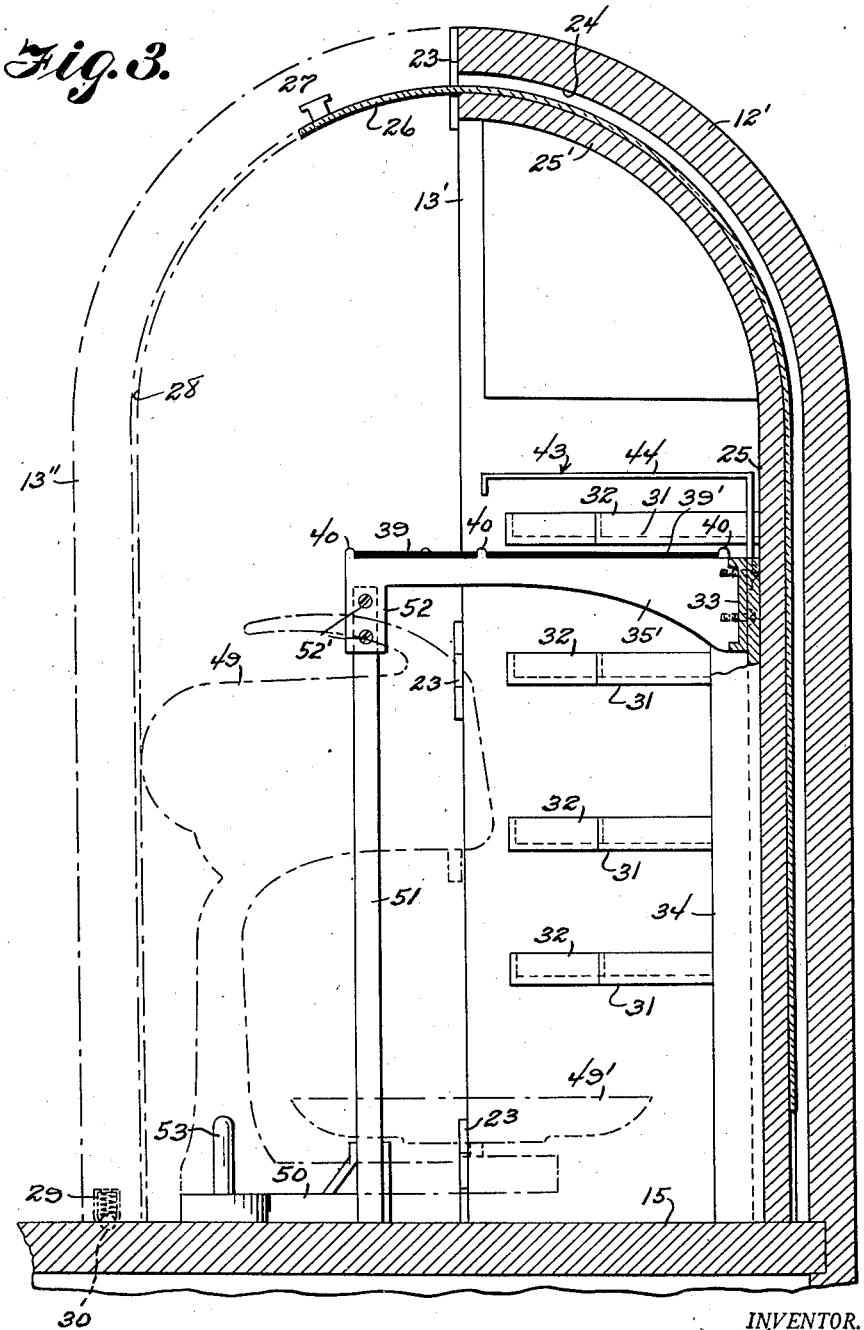
Figure 3 is a vertical transverse section of my device.

Referring to the drawings, wherein like characters of reference denote corresponding parts throughout the several views, the embodiment of the invention, as is exemplified therein, is comprised in a cabinet made up of a base 11, a back wall 12, lower side walls 13 and 14, and a top wall 15, the latter having its rear edge mortised into the back wall 12, after the manner as shown in Figure 3. The top wall 15 is supported at a convenient working height from the floor level and has a winged extension 16 hinged, as at 17, to each of its ends, which, when raised to horizontal position, is supported on a bracket 18 that, in turn, is hinged as at 19 to a side wall as shown in dotted lines in Figure 1. The hinge connection may be of the semi-circular leaf type with pins pivotally connecting the leaves together. When not in use, the brackets 18 are swung flatwise against the side walls 13, and 14, beneath projecting end portions of the top wall 15, and the winged extensions or shelves 16 downwardly in like manner against the outer sides of the brackets, as is well understood. The open front of this lower portion of the cabinet is provided with a horizontally disposed cross member or rail 20, to provide a space above the same to receive drawers 21, and a larger space below it for use as a cupboard for storage purposes, the latter space being normally closed by oppositely hinged doors 22.

The back wall 12, of this lower portion of the cabinet, is extended for a distance above the top wall 15 and terminates at its upper end in a forwardly curved portion 12', the front edge of which is disposed in a plane parallel to but somewhat in rear of a longitudinal median line across the top wall 15; while the side walls 13 and 14 are likewise extended above the top wall and have their upper end portions 13' and 14' curved to conform to the curvature of the upper portion 12' of the back wall and for securement thereto, and their front edges are disposed in the same plane as that of the front edge of the curved back wall portion 12'.

Hinged as at 23 to the front edges of the upper side wall portions 13' and 14' are complemental side wall sections 13" and 14", which are to be swung on the hinges outwardly and rearwardly from their normally aligned positions with the side wall portions 13' and 14' to positions closely paralleling the outer sides of the latter, whenever the upper part of the cabinet is required to be fully opened for access to all parts of its interior. The lower ends of these side wall sections 13" and 14" have clearance with the upper surface of the top wall 15, while their upper ends are curved forwardly and downwardly in continuation with the reversely curved ends of the side wall portions 13' and 14', and merge into their vertical front edges, the joint curvature of the wall portions and sections defining substantially the arc of a circle.

Rising from the top wall 15, in slightly spaced relation to the opposed portion of the main back wall 12, as at 24, is a false back wall 25, which has its upper end portion 25', curved to conform to the curvature of the upper end portion of the main back wall, so that its front end edge is disposed in the same plane therewith; the space 24, at the front ends of the wall portions 12' and 25' presenting a slot-like opening for the insertion therein of a flexible closure 26 that is fully housed within the space 24, when disposed in its position to open up the front side of the upper cabinet portion; a hand-grip 27 being provided at the front end of the closure for its manipulation. The inner sides of the hinged side wall sections 13" and 14" are each provided with a slot-way 28 that extends in continuation of the adjacent side of the slot-like opening of the space 24 and in parallel relation to the front edge of its respective side wall section to the bottom end thereof. Mounted in the bottom edge of each of the hinged wall sections 13" and 14" is a spring sustained detent 29 that engages in a socket or depression 30 formed in the top wall 15 to hold the wall sections against unintended displacement, when they are disposed in line with their respective side wall portions 13' and 14'. To close the front of the upper cabinet portion, the closure 26 is withdrawn from the space 24, by a pulling effort on the hand-grip 27, and slid forwardly and downwardly in the slot-ways 28 until its leading edge closely abuts the surface of the top wall 15, when its trailing edge will remain engaged within the outlet end of the space 24.

Figure 2:
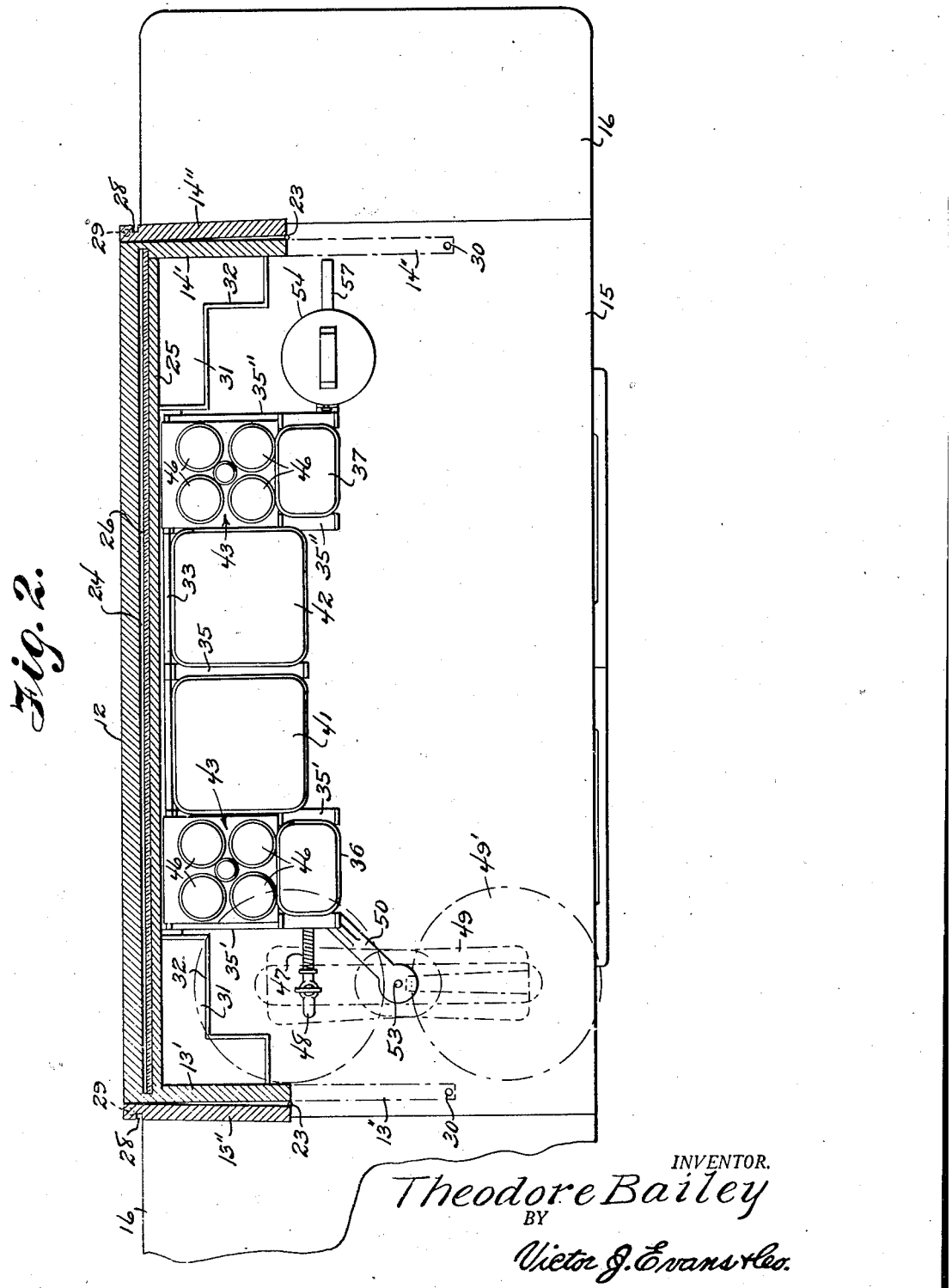
Figure 2 is a horizontal section taken on the line 2—2 of Figure 1.
Figure 4:
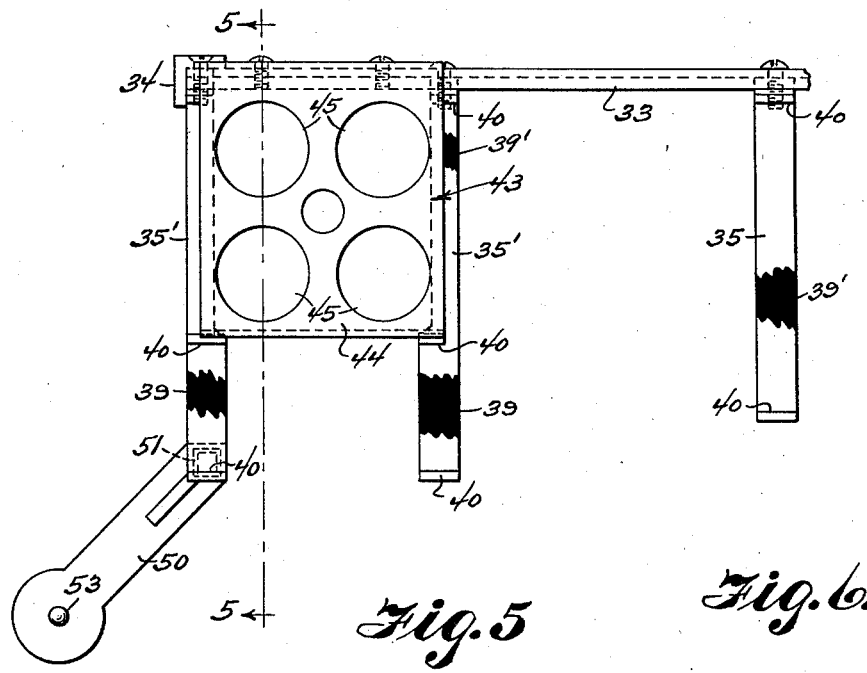
Figure 4 is an enlarged fragmentary top plan view of the supporting structure per se, the same being removed from within the cabinet.

Mounted in each of the corners, formed by the angle of the false back wall 25 and the side wall portions 13' and 14', is a tier of shelves 31, each of the shelves being provided with an upstanding flange 32 at its outer sides if desired and substantially as is shown in Figure 2. Extending between the opposite tiers of shelves 31 is a frame that is made up of a horizontal member or bar 33 which is supported at its opposite ends on angled posts or standards 34, and a plurality of horizontally disposed bracket members or arms projecting forwardly from points of securement to the member or bar 33. These members or arms are spaced along the length of the member or bar 33 and a pair of the same, designated 35' and 35" at the opposite ends of the member or bar, is made longer than an intermediate member or arm 35 of the pair 35', at the left hand end of the member or bar, to support a food ingredient or material measuring and dispensing device 36 between outer end portions of the same, and the pair 35", at the right hand end of the member or bar, to similarly support another measuring and dispensing device 37. These devices 36 and 37 are each comprised in a container having offsets formed on opposite sides of the same to rest on the top sides of the bracket members or arms complemental thereto. Cushioning elements 39, shown fragmentarily in Figure 4 such as rubber pads or the like, are preferably positioned on the members or arms 35' and 35", beneath the offsets 38 and between spaced transversely extending beads or ribs 40 formed on the top side of the members or arms, to protect the containers from breakage, if made from glass or the like, and to otherwise prevent their unintended displacement from the members or arms. Other measuring and dispensing devices 41 and 42 are in like manner supported from the inner of the pairs of bracket members or arms 35' and 35", and the bracket member or arm 35 positioned intermediate thereof. Mounted on the frame member or bar 33 are angled supporting brackets 43, the horizontal portion 44 of each being extended forwardly in over-lying relation to the space between the bracket members or arms forming the pairs 35', and 35", and being provided with a series of circular openings 45 to receive and support an equal number of condiment containers 46 (Figure 2). To cushion the containers of the measuring and dispensing devices 41 and 42, when emplaced on the supporting frame, other rubber pads or the like 39' will be secured in proper position on the top sides of the inner of the pairs of bracket members or arms 35' and 35", rearwardly of the transverse beads or ribs 40 at the rear ends of the like pads 39, and on the top side of the intermediate bracket member or arm 35, which also has transverse beads or ribs at its front and rear ends.

In use, the containers of the several food ingredients or material dispensing devices 36, 37, 41 and 42 are especially designed for holding bulk supplies of particular ingredients or materials, for instance, the container of the device 36 for a liquid, such as olive oil, vinegar or the like; those of the devices 37, and 41 for granular or pulverulent materials, such as sugar and coffee; and that of the device 42 for a powdered material, such as flour; the containers of the devices 41 and 42 preferably having greater capacities than those of the devices 36 and 37, by reason of the larger quantities of materials, such as sugar and flour, being employed at one, and more often than not, and the same time. Each of the containers 46 (Figure 2) will likewise be designated for a particular condiment or seasoning and are to be separately removed from the supporting frame for use, as required. The liquid dispensing device 36 preferably has a mixing apparatus 49 associated with it for the discharge of its content, or a portion thereof, from a spigot 48 at the free end of a flexible spout 47 attached to its lower end; the container of the device 36, as well as those of the devices 37, 41 and 42, being inverted for the gravity discharge of their contents when being dispensed. The mixer 49 is normally housed within the upper cabinet part in the space at the front of the left hand tier of the shelves 31 and between the outer of the bracket members or arms 35' and the side wall portions 13' and 13" substantially as depicted in Figure 2.

Figure 5:
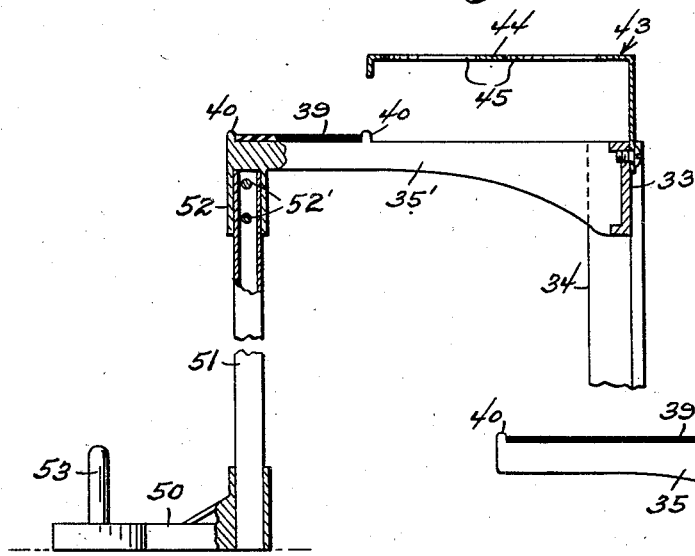
Figure 5 is a vertical transverse section taken on the line 5—5 of Figure 4.
Figure 6:
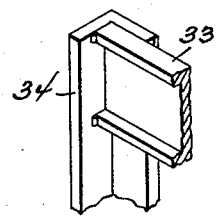
Figure 6 is a sectional detail, in perspective, of a corner portion of the supporting structure.
Figure 7:
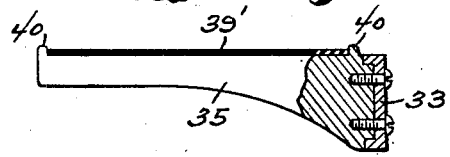
Figure 7 is another sectional detail, showing one of the transverse elements of the supporting structure.

In use, the mixer 49 is movable outward toward the front of the top wall 15 of the lower cabinet part and, with the side wall section 13" swung outwardly and rearwardly on its hinges 23 to a position against the outer side of the side wall portion 13', is readily accessible from all of its sides. To give effect to this arrangement, the mixer 49 is supported on the outer end of a bracket arm 50 that has its inner end pivotally engaged with the lower end of a cylindrical post 51 which has its upper end fastened, as at 52', in a socket 52 secured to the lower side of the outer end of the outer of the bracket members or arms 35', as is best shown in Figures 3 and 5. The mixer 49 is detachably mounted on the bracket arm 50 by having a socket in the lower side of its base engaged with a pin 53 projecting upwardly from the outer end of the bracket arm. By having the spout 47 flexible, a wide range of movements of the spigot 48 to positions of discharge is permitted, or it may be moved rearwardly of the space at the front of the tier of shelves, when not needed. With the mixer 49 moved to its forward position, the spout 47 may be adjusted to position the spigot 48 over the bowl 49' of the mixer for the discharge of liquid from the dispensing device. Each of the measuring and dispensing devices 37, 41 and 42 have their lower discharge ends provided with attachments 37', 41' and 42', respectively, for performing the required measuring and dispensing functions, the quantities of the ingredients or materials to be dispensed being in units of measurement commonly employed in household kitchens.

Mounted in the space in front of the right hand tier of the shelves 31, and between the outer of the pair of bracket members or arms 35'' and the opposed side wall portion 14', for instance, is a flour mixer 54 which is supported in place by a sleeve type of bracket 55 that is engaged on the upper end of a cylindrical post 56. The upper end of the post 56 being secured to the outer end of the outer of the bracket members or arms 35''. The container of this mixer 54 is provided with a dispensing attachment 54', at its lower discharge end and has a removable cover 54'' for its upper filling end, while on its side opposite its point of support from the post 56, it is provided with a handle 57 and the hand grip portion 58 of an internal mixing element (not shown).

The sliding closure 25 can be made from any suitable material, such as one of the plastics, and may be either opaque, translucent or transparent, plain or colored, to meet varying tastes. Also, the containers of the several measuring and dispensing devices, as well as certain of the parts of the measuring and dispensing attachments thereof, may also be made from, for instance, transparent materials, such as glass or one of the plastics, or a combination of such materials, in order that the contents may be under observation for replenishment when needed, and during the measuring and dispensing operations. With the closure 25 in its forward position to enclose the front of the upper cabinet part, the instrumentalities within the latter will be maintained in their orderly arrangement and free from contaminating accumulations of dust, at all times.

Having thus fully described my invention, it will be understood that various changes in design and minor structural details, as well as in the arrangement of the instrumentalities, may be resorted to, without departing from the spirit of the invention, or its scope as claimed.

What I claim is:

1. A kitchen cabinet comprising a base compartment, an inset upper compartment open at its front on the top of said base compartment, and a tier of shelves within said upper compartment at each end thereof, in combination with a container-supporting rack, said rack comprising an open frame having leg elements rising from said top forwardly of and in line with the inner sides of said shelves, a horizontal bar secured to the rear wall of said upper compartment, spaced arms projecting forwardly from said bar, the outer of said arms having their forward ends engaged with the upper ends of said leg elements, angled brackets supported on said bar and having horizontal portions spacedly overlying certain of said arms, said horizontal portions having uniformly spaced openings to seat a container in each, a support mounted for limited turning movements on the lower end of one of said leg elements, means on said support for the mounting of a food processing device for its movement with and relatively to the support to position against the adjacent tier of shelves when not in use, and a second support mounted on the other of said leg elements to sustain another food processing device in position adjacent the other of said tiers of shelves.

2. The invention as defined in claim 1, with the said certain arms arranged in pairs, one pair spaced from each side of an intermediate arm, said pairs of arms having a greater length than that of said intermediate arm, the front ends of each pair of arms projecting beyond the forward edge of the horizontal portion of an adjacent of said brackets to support a single container therebetween, said intermediate arm constituting a common support for one side of each of a pair of containers having their opposite sides supported from the adjacent of the arms of each of said pairs.

3. The invention as defined in claim 1, with shelves of each of said tiers spaced one above the other and made substantially L-shape to provide a clearance for the adjacent of said food processing devices, one leg of each of said shelves being secured to an end wall of said upper compartment and the other leg to the rear wall thereof.

4. The invention as defined in claim 1, with the said one leg element having the form of a length of tubing with its upper end secured in a socket depending from the under side of the forward end of the arm complemental thereto and its lower end engaged in a socket mounted on the connected end of the first named of said supports to allow for the required movement of the latter to effect the transfer of said food processing device from and to its normal position of non-use.

THEODORE BAILEY.

REFERENCES CITED

The following references are of record in the file of this patent:

UNITED STATES PATENTS

| Number | Name | Date |
|---|---|---|
| Re. 15,106 | Peters | May 17, 1921 |
| 1,944,405 | Copeland | Jan. 23, 1934 |
| 1,432,663 | Brandts | Oct. 17, 1922 |
| 513,010 | Green | Jan. 16, 1894 |
| 1,400,145 | Duncan | Dec. 13, 1921 |